April 26, 1966 W. B. GAUNT, JR 3,248,570

SIGNAL DISCRIMINATOR CIRCUIT

Filed Aug. 1, 1963

2 Sheets-Sheet 1

INVENTOR
W. B. GAUNT, JR.
BY
R. C. Winter
ATTORNEY 3,248,570

SIGNAL DISCRIMINATOR CIRCUIT

Wilmer B. Gaunt, Jr., Lincroft, N.J., assignor to Bell Telephone Laboratories, Incorporated, New York, N.Y., a corporation of New York Filed Aug. 1, 1963, Ser. No. 299,690
6 Claims. (Cl. 307—88.5)

This invention relates to amplitude-discriminating circuits and, more particularly, to such circuits utilized in magnetic memory systems to discriminate between binary ONE and ZERO signals which, while characterized ideally by signal voltages of different amplitudes, may in practice be signals of substantially the same amplitudes.

In systems of this type, ONE signals represent information stored at discrete locations in the memory. The absence of a ONE signal at any location indicates the presence of a ZERO. Finite signals retrieved from locations in the memory storing ZEROS are attributable to driving or storage media imperfections.

Both ONE and ZERO signals may include additive drive circuitry noise which, in the worst case, detracts from the ONE signal amplitude and enhances the ZERO signal amplitude. Also, in large capacity memories having a relatively short read-write cycle time, writing transients often fail to decay completely before the read or information retrieval interval begins. As a result, in the memory sensing circuits utilizing high gain, alternating-current coupled amplifiers, writing transients may produce spurious signals in the retrieval interval, evidenced by level shifts in the amplifier output.

In the presence of such level shifts, bona fide signals cannot be obtained by a simple amplitude detection or thresholding circuit sensitive to the amplifier output. In order to minimize these effects, the amplifier bandwidth often is adjusted so as to reduce the spurious signals and direct-current level restoration is employed upon initiation of the retrieval operation in order to reduce the effects of amplifier level shifting.

In practice, the direct-current restoration circuit is connected at the output of the amplifier. This circuit provides a dynamic compensatory direct-current level which, in effect, is added to the amplifier output at the outset of the retrieval operation, such that the amplified memory output signals invariably appear to originate from a fixed direct-current reference level.

Following the method of operation employed in contemporary arrangements, the amplitude of the desired signal after direct-current restoration is compared with a threshold reference level related to the level established by the direct-current restoration circuit. Detection of the desired signal occurs if its amplitude exceeds the threshold reference level. In order to improve discrimination between ONE and ZERO signals, a strobe circuit is employed in such a manner that the threshold circuit is held inoperative until the ONE-to-ZERO signal ratio is optimum.

In practice, the threshold level is adjusted so as to fall between the minimum ONE and maximum ZERO signals. Thus, for signal detection in such memory applications, a direct-current restoration circuit, a strobe circuit, and a threshold circuit are all required in contemporary sensing arrangements.

It is, therefore, an object of this invention to provide an improved combination direct-current level restoration and strobing circuit coupled with an amplitude-discriminating circuit suitable for use in magnetic memory signal detection.

It is another object of this invention to provide a reliable circuit of this type capable of operating in the presence of noise which may exceed the signal to be detected.

It is a further object of this invention to provide a discriminator circuit which capitalizes on a characteristic of the binary ONE and ZERO signals retrieved from magnetic memories.

The above objects are attained in accordance with one illustrative embodiment of the invention in which a signal-sensing circuit comprises a linear amplifier, a combination detector and direct-current level restoration circuit, an amplitude-sensitive threshold circuit connected to the output of the detector and means for regenerating signals passed by the threshold circuit. The detector and direct-current restoration circuit comprises a strobed clamp capacitively coupled to the amplifier output. The direct-current restoration obviates signal level shifts occurring in the memory.

It is inherent in magnetic memories that the zero signal peaks earlier than the ONE signal. I have found that advantage can be taken of the greater ONE-to-ZERO ratio which necessarily exists at or beyond the ONE peaking time through the simple expedient of inverting the input signal. In this fashion a unique reverse slope detection circuit is realized in which the ZERO signal is completely suppressed while, by a judicious choice of low frequency amplifier cut-off, the amplitude of the ONE signal at the threshold circuit input is increased, thus providing the ideal signal-to-noise discriminating circuit.

It is, therefore, one feature of this invention that a signal discriminator circuit passing signals larger than a threshold of the same polarity as the input signals is arranged so as to invert the input signals.

More particularly, it is a feature of this invention that an amplitude discriminator circuit comprising an amplifier, a combination detector and direct-current level restorer and a threshold poled to correspond to the received signal has the connection of the signal input leads to the amplifier reversed.

It is another feature of this invention that the signal detector and direct-current level restoration circuit comprises a stroke clamp in which the strobe signal is applied to the clamp at or just beyond the peak of the inverted ONE signal.

It is a further feature of this invention that the output of the threshold circuit is connected to the amplifier to feed back and regenerate the amplified ONE signal while the clamp is open.

A complete understanding of this invention and of these and various other features thereof may be gained from consideration of the following detailed description and the accompanying drawing, in which.

Figure 1:
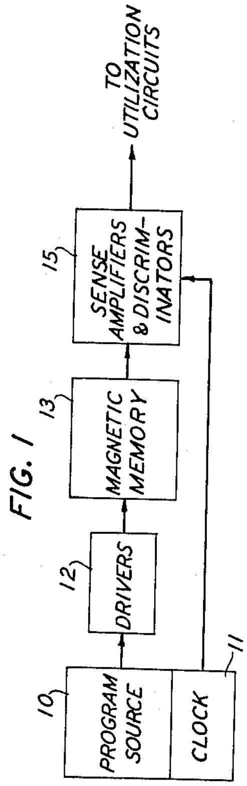
FIG. 1 is a simplified block diagram illustrating a magnetic memory system in which the present invention may be employed.

Turning now to the drawing, FIG. 1 depicts a typical memory with its attendant access and sensing circuitry. Thus a source 10 of information for storage in the memory and of commands directing the manner of storage supplies signals in synchronism with the output of a clock source 11 for actuation of the drive circuitry 12. The latter circuitry may include, for example, X and Y coordinate drive sources for supplying coincident read and write signals and associated access circuitry for coupling the driver outputs to the individual storage circuits in the magnetic memory 13. Such circuitry and operations are now well known in the art and serve to store information in the memory and to retrieve information therefrom as desired.

The individual storage areas in the magnetic memory comprise bistable elements which produce well-defined output signals as they are switched between their stable states. Such signals induce corresponding voltages in the memory-sensing circuitry 15. The latter circuitry, which includes the novel circuit in accordance with this invention, provides distinct binary ONE and ZERO signals to the utilization circuits upon command from control pulses generated in circuitry controlled by the clock 11.

Retrieval of information from a magnetic memory is achieved by coincident current application to a particular information storage location and sensing whether or not the applied signals switch the bistable element at that area to indicate the presence of a ONE signal or merely bias the element in a direction which prohibits switching between the bistable states, leaving the element in its former state and producing the output ZERO signal by what is termed the shuttling voltage.

Ordinarily, the distinction between the complete switching voltage and the shuttling voltage is ample to permit discrimination in the output circuitry with simple detection circuitry. However, the unique arrangement of a magnetic memory dictates that a sense lead which develops the output signal for a particular storage location also links a considerable number of other storage locations representing other stored information. In addition, the retrieval signal applied to a particular storage element is also applied to a large number of other storage elements. Such other locations will serve to develop the shuttling signals upon selection of a particular element which may, for example, contain the ONE signal, so that the sense lead will carry the ONE signal concurrently from a single storage element and the shuttling signals from a large number of storage elements. These shuttling signals may produce a ZERO output signal of an amplitude equivalent to that produced by the single storage element containing a ONE.

Other factors contribute to the noise produced in magnetic memory retrieval which can be traced to driving or storage media imperfections. In toto, such noise may even be sufficient to surpass the low magnitude ONE signals, thus creating an impossible situation for detection with a conventional amplitude-discriminating circuit.

Fortunately, however, the ZERO signal produced in magnetic memories reaches its peak amplitude earlier than the ONE signal, thus affording a satisfactory ONE-to-ZERO ratio beyond the ONE peaking time. Prior circuits have taken advantage of this circumstance only by employing a threshold of like polarity to the detected signal and strobing the threshold circuit at or near the peak of the ONE signal.

Figure 2:
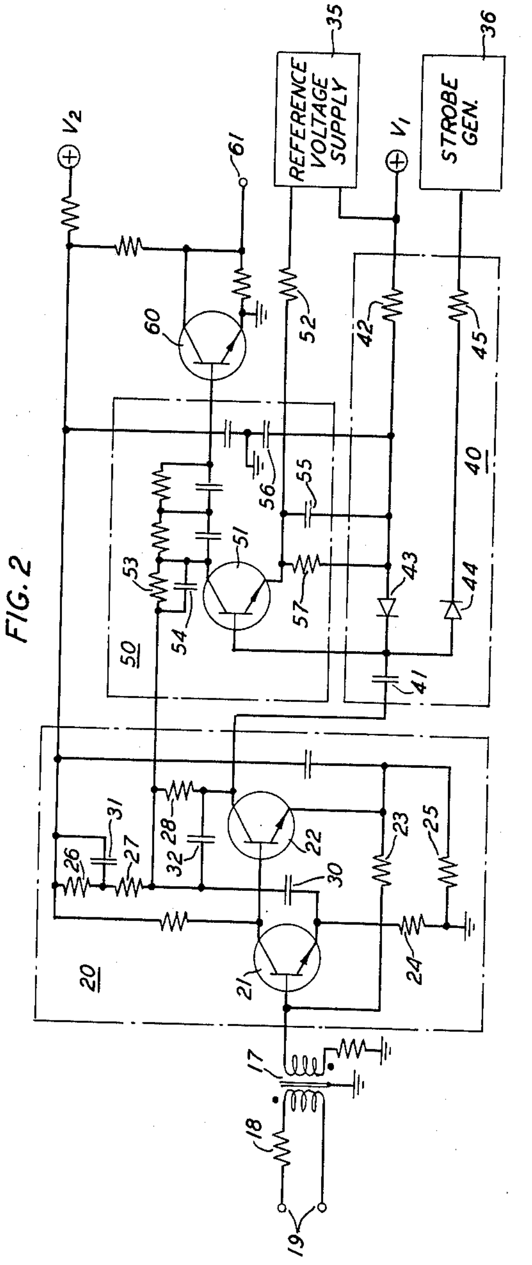
FIG. 2 is a schematic diagram of a sensing circuit including a discriminator in accordance with the invention for use in the system of FIG. 1.

Circuits in accordance with my invention also discriminate between ONE and ZERO signal amplitudes at the optimum time but in a unique manner in which a strobbed clamp circuit performs both the direct-current restoration and strobe operations. A sensing circuit in accordance with my invention is illustrated in FIG. 2 and is adapted particularly to discriminate between binary ONE and ZERO signals originating at the same point in time but peaking and terminating at distinct points in time, the ONE signal peaking and terminating later than the ZERO signal. Relying on this characteristic of output signals received from memories of the magnetic type, elaborate circuitry for peak detection is not required. Rather, it is simply a matter of reversing the input leads to the sensing circuit and properly timing the pulse detection, thereby permitting the discriminator to act upon the trailing edge of the desired signal from its peak to the base line.

The circuit shown in FIG. 2 is duplicated for every read out or retrieval lead from the memory 13. A transformer 17 couples to the input of the amplifier 20 the signals that are received through resistor 18 from input terminals 19. The latter terminals are coupled to the magnetic memory 13, FIG. 1. For reasons detailed more fully below, I depart from prior practice in this specific embodiment of my circuit by connecting my transformer 17 so that the input and output windings produce a polarity inversion, as indicated by the appropriate dots adjacent the windings. Accordingly the positive input signal from the memory 13 is applied to the amplifier as a negative signal. This enables, in accordance with an aspect of my invention, the strobing of the positive slope of the negative signal, as described below. Other techniques for signal inversion before the strobing and detection may also be employed.

One terminal of a secondary winding of transformer 17 is connected to the base electrode of a transistor 21 which is the first stage transistor in a two-stage linear amplifier 20 with direct-current feedback to stabilize the quiescent point and alternating-current feedback to stabilize the gain. The second stage of the amplifier is represented by the transistor 22 having its base coupled directly to the collector output of transistor 21. The direct-current feedback path is provided by resistors 23 connected between the emitter electrode of transistor 22 and one terminal of the secondary winding of transformer 17 and resistors 24 and 25 connected to the other terminal of the secondary winding of transformer 17 through ground from the emitter electrodes of the transistors 21 and 22, respectively. Similarly, resistors 24, 26, 27 and 28, and capacitors 30, 31 and 32 provide the alternating-current feedback path between the transistor 22 and the transistor 21.

The magnetic memory storage operation produces a direct-current unbalance at the secondary of transformer 17. I have found it to be expedient, in view of the low signal level at this point, to defer direct-current level restoration until the signal has been amplified. This of course dictates the design of an amplifier with sufficient linear dynamic range to allow amplification of the ONE signal without clipping and with sufficient linear gain to amplify the signal to a suitable thresholding level where threshold variations are a small percentage of the amplified ONE signal. Amplifier 20 satisfies these requirements. The high frequency cut-off is determined by resistor 28 and capacitor 32, while the low frequency cut-off is established by resistor 26 and capacitor 31 in conjunction with resistor 27.

The detector and direct-current restoration circuit 40 comprises a capacitor 41 connected to the output of the amplifier 20 and has a direct-current level established by conduction through a clamp circuit including resistor 42, diodes 43 and 44, and resistor 45. A reference voltage supply 35 maintains a regulated positive output voltage with respect to positive supply potential V1, while the inactive strobe generator 36 is at ground level. The midpoint between devices 43 and 44 is connected to one side of the capacitor 41. Capacitor 41 is of a relatively low value, as is the alternating-current impedance of the amplifier 20, such that capacitor 41 can be charged and discharged rapidly. Upon application of a sufficiently positive strobe pulse by the generator 36, diode 44 will be back-biased and conduction through the clamp will cease. The effect is to transmit the amplified signal to the threshold transistor 51 at the direct-current level established by the clamp circuit during application of the strobe signal. Thus all information signals are referred to a common base line.

The threshold circuit 50 comprises transistor 51 which has its threshold value established by a reference voltage at its emitter electrode from supply 35 through resistors 57, 52 and 42. If the input signal received at the base of transistor 51 exceeds the threshold value, indicative of a ONE signal, the transistor begins to turn on. The output of the transistor 51 is fed back through resistor 53 and capacitors 54 and 30 to the emitter electrode of the transistor 21 in the amplifier 20. Thus with the clamp circuit open to permit signal passage, the signal fed back to the amplifier 20 is of a polarity to regenerate itself.

The circuit time constants are such that a pulse is produced at the collector of the transistor 51 which is of sufficient amplitude and width to provide a minimum output signal from the buffering state comprising the transistor 60. Transistor 60 is normally conducting, thereby establishing a ground reference level at the output terminal. The signal received at its base from the threshold circuit 50 turns off the transistor 60 so as to produce the output signal. The signal at the output terminal 61 may be coupled to the utilization circuits indicated in FIG. 1.

An understanding of the basic operation of this circuit and the distinctions with the operation of prior art circuits of this type may best be gained from consideration of typical operations with reference to the voltage versus tme diagrams of FIGS. 3 to 9. Unipolar signals, in this instance positive signals, are received from the magnetic memory 13, FIG. 1, at the input terminals 19, FIG. 2, the positive ONE signals and the lack thereof, i.e., ZERO signals, retrieved during the "read" cycle, representing information that had been previously stored in the memory at discrete storage locations during the write cycle.

Positive ZERO signals are a result of noises generated during the read cycle or the read out of partial ONE signals previously written in the memory, both of which conditions may be attributed to driving or storage media imperfections. In such stores, where the information output is unipolar, and as a consequence noise concellation cannot be adequately achieved, the ZERO signals have been observed to have substantially the same peak amplitude as the ONE signals. Under unusual conditions which may occur in such memories at various times, the peak amplitude of the ZERO signal may even surpass that of the ONE signal. Fortunately, the ZERO signals peak at an earlier time than the ONE signals and are of lesser magnitude.

Considering first the operation as it would occur if the input signals were not inverted, the positive input signals would be amplified without distortion despite the existence of varying direct-current levels at the input. Thus, absent the signal reversal performed in accordance with my invention, signals would appear at the output of the amplifier 20, as shown in FIG. 3, depending upon the direct-current level at which they are received by the amplifier 20.

It is apparent that the amplified ONE signal could not be distinguished with respect to the amplified ZERO signal merely by employment of a simple, direct-current threshold stage as both signals remain superimposed on the varying direct-current level caused by arbitrary programs for writing information in the memory under different conditions of balance. Thus the clamp circuit 40 would be used in conjunction with a signal from the strobe generator 36 applied at the appropriate time to restore the signal level to a fixed reference point before the threshold circuit is reached.

During strobing, the clamp circuit would be rendered nonconductive and the charge on capacitor 41 during this interval reflected at the base of transistor 51. Typical waveforms for a ONE and a ZERO which may be presented to capacitor 41 during this interval are also indicated in FIG. 3. Upon application of the strobe signal, ONE and ZERO signals transmitted through capacitor 41 would be referred to a common base line. Thus positive-going signals at the output of the amplifier 20 would be transmitted without distortion through capacitor 41 to the input of the threshold circuit 50.

Figure 3:
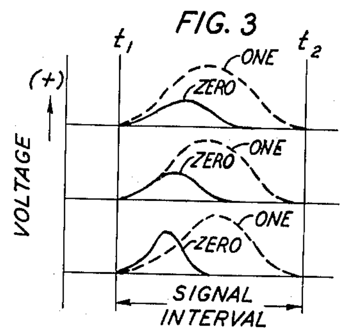
FIGS. 3 and 4 are voltage versus time diagrams illustrating the nature of the operation of prior art circuits of this type.
Figure 4:
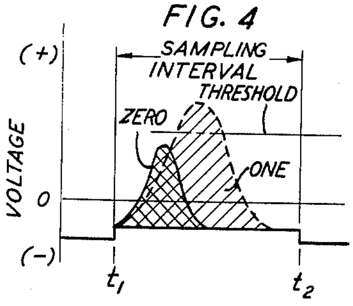

If the strobe is applied between times $t_1$ and $t_2$, FIG. 3, the resultant output to the threshold circuit 50 would be as shown in FIG. 4. In order to discriminate between ONE and ZERO signals, the threshold level ordinarily would be adjusted to be between the maximum ZERO level and the minimum ONE level as indicated in FIG. 4. In order to accomplish this, however, there must be some assurance that a distinction in amplitude always is present in fact between the ONE and ZERO signals. This, of course, is not true in practice since, as indicated hereinbefore, the ZERO signal may at times exceed the ONE signal in amplitude. Advantage may be taken of the fact that the ZERO signal always precedes the ONE signal in the sampling interval by resorting to a second strobe subsequent to application of the threshold so as to distinguish the ONE and ZERO signals in time. However, this approach serves to introduce additional complexity by requiring an independent strobe circuit.

In accordance with my invention, advantage is taken of the greater ONE-to-ZERO ratio which always exists at or beyond the peak of the ONE signal. This advantage is attained by reversing the input signal as applied to the amplifier 20 and by strobing the clamp only during the interval in which the reverse slope of the ONE signal is present. Through this expedient the strobe and clamp operations are combined, and strobing after thresholding is obviated.

Figure 5:
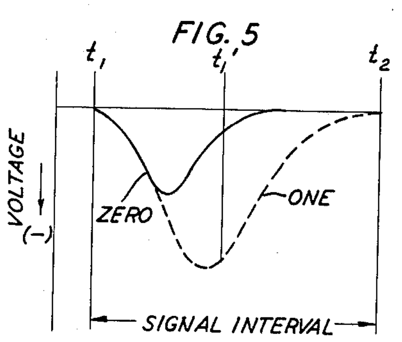
FIGS. 5 to 9 are voltage versus time diagrams illustrating the nature of the operation of the present invention.
Figure 6:
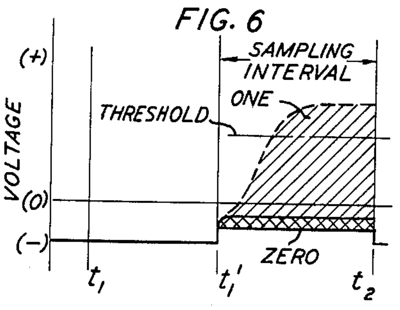

This operation is illustrated be reference to FIGS. 5 and 6. Representative ONE and ZERO signals are shown as they appear at the output of amplifier 20 as a result of a reversal of the amplifier input leads, thus inverting the input signals received by the sensing circuit. Again, after direct-current level restoration, the signals transmitted via capacitor 41 are shown in FIG. 5 between times $t_1$ and $t_2$ which define the interval during which the strobe signal was applied in the previous example. In the instant case, since the threshold circuit is only operative on the positive-going slope of a signal, the strobe signal is applied at time $t_1'$, which is at or just beyond the time of occurrence of the peak of the ONE signal. As may be readily seen from FIG. 5, the ZERO signal at this time $t_1'$ has decayed to a point at or near the reference level established in the clamp circuit 40, such that the ONE and ZERO outputs from the clamp, appearing at the base of the transistor 51, are substantially as shown in FIG. 6.

The threshold level in the presence of a substantially increased ONE-to-ZERO ratio may be decreased proportionately. In this instance the discrimination is substantially complete in that only the crosshatched portion, FIG. 6, represents the ZERO signal and is transmitted to the theshold circuit while the full amplitude of the ONE signal, illustrated by the total slant-lined portion and produced by the trailing edge of the ONE signal, is so provided.

Figure 8:
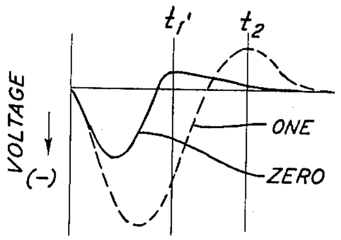
Figure 9:
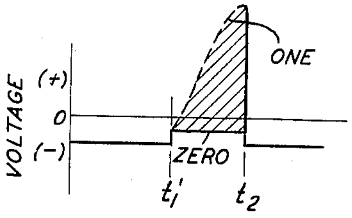

This obviously improved discriminating circuit is realized without adding major circuit elements to the prior art type of circuit but by reorganizing the elements into a new combination in accordance with my inventive concepts. Furthermore, with a judicious choice of the amplifier low frequency cut-off, the resulting signal differentiation will provide a ONE-to-ZERO output ratio at the clamp circuit which virtually eliminates the ZERO signal at the input to the threshold circuit. This is illustrated in FIGS. 7–9.

Figure 7:
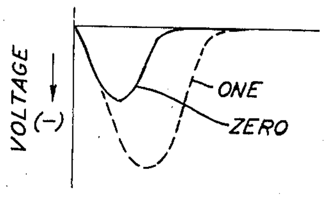

FIG. 7 depicts ONE and ZERO signals as they may appear at the input to amplifier 20. A judicious choice of amplifier low frequency cut-off may modify these signals so as to appear as shown in FIG. 8 at capacitor 41. The ZERO signal now crosses the reference level and reverses in slope at or near the peak value of the ONE signal. By strobing the clamp between this particular point at $t_1'$ and the reverse peak of the ONE signal at $t_2$, the unique reverse slope detection principle discussed hereinbefore is utilized, and the input to the base of the threshold transistor 51 is as shown in FIG. 9. As may be noted therein, the ZERO signal has been effectively removed. ONE signals on the other hand have their amplitude enhanced considering the reverse slope from peak to base line relative to the absolute peak amplitude.

It may be seen that the employment of this reverse slope detection scheme eases the demand on the strobe circuitry, permitting application of the strobe signal at a specific time. The strobe in this instance is applied most conveniently at or after the peak of the ONE signal in the range of its reverse slope down to the threshold level. Thus although the peak time may vary, the application point of the strobe signal is not critical and adequate discrimination will result despite the fact that the strobe signal is not applied precisely at the peak amplitude of the ONE signal in each instance.

It is to be understood that the above-described arrangement is illustrative of the application of the principles of the invention. Numerous other arrangements may be devised by those skilled in the art without departing from the spirit and scope of the invention.

What is claimed is:

1. A circuit for distinguishing noise and information signals of like amplitude and polarity super-imposed on varying direct-current levels and in which the noise signal peaks prior to the information signal in a given time interval comprising input circuit means for receiving said input signals of one polarity, output circuit means for generating deleted signals of said one polarity, a linear amplifier connected to said input circuit means, a threshold circuit passing only signals above a fixed reference level and connected to the input of said output circuit means, means coupling the output of said amplifier to said threshold circuit, means for establishing a direct-current reference level at said coupling means, means for inverting said input signals so that signals of the opposite polarity are presented to said amplifier, and means for inhibiting said level-establishing means at a time which permits presentation only of the trailing slope of said inverted signals to said threshold circuit.

2. A circuit for discriminating between unipolar, like amplitude noise and information signals in which the noise signal peaks earlier in a given time interval than the information signal comprising a linear amplifier, a threshold circuit arranged to pass said unipolar signals above a fixed reference level, a capacitor coupling the output of said amplifier to said threshold circuit, a normally conducting clamp circuit establishing a direct-current reference level at said capacitor, means for applying said unipolar signals to said amplifier in inverted form, and means for inhibiting said clamp circuit during a distinct time interval which will permit presentation only of the trailing edge of said information signal to said threshold circuit.

3. An amplitude discriminator circuit comprising a source of binary information signals of one polarity, a threshold circuit adapted to produce an output signal in response to the receipt of a signal of said one polarity greater than a predetermined reference level, means for reversing the polarity of said information signals, amplifying means connected to said polarity-reversing means, a circuit coupling said amplifying means to said threshold circuit, means normally disabling said coupling circuit, and means for inhibiting said disabling means when said information signal has passed its peak amplitude so as to apply only the trailing edge of said information signal to said threshold circuit.

4. An amplitude discriminator circuit in accordance with claim 3 wherein said coupling circuit comprises a capacitor and wherein said disabling means comprises a normally conducting clamp circuit connected to establish a reference voltage level on said capacitor.

5. An amplitude discriminator circuit in accordance with claim 4 wherein said inhibiting means comprises a strobe signal source synchronized with the timing of the input to said amplifying means for generating pulses to inhibit conduction through said clamp circuit.

6. An amplitude discriminator circuit comprising a source of binary information signals of one polarity, a threshold circuit adapted to produce an output signal in response to the receipt of a signal of said one polarity greater than a predetermined reference level, means for reversing the polarity of said information signals, a circuit coupling said polarity-reversing means to said threshold circuit, means normally disabling said coupling circuit, means for inhibiting said disabling means when said information signal has passed its peak amplitude so as to apply only the trailing edge of said information signal to said threshold circuit, amplifying means applying the reversed polarity information signals to said coupling circuit, and means for transmitting the output of said threshold circuit to said amplifying means to regenerate said information signal.

References Cited by the Examiner

UNITED STATES PATENTS 3,058,008 10/1962 Clapper ------------ 307—88.5

ARTHUR GAUSS, *Primary Examiner.*

J. BUSCH, *Assistant Examiner.*